(12) United States Patent
Biernath et al.

(10) Patent No.: US 8,149,351 B2
(45) Date of Patent: Apr. 3, 2012

(54) PASSIVE AND HYBRID DAYLIGHT-COUPLED BACKLIGHTS FOR SUNLIGHT VIEWABLE DISPLAYS

(75) Inventors: Rolf W. Biernath, Wyoming, MN (US); Jennifer R. Yi, Woodbury, MN (US); Keith M. Kotchick, Saint Paul, MN (US); John S. Huizinga, White Bear Lake, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 713 days.

(21) Appl. No.: 12/330,155

(22) Filed: Dec. 8, 2008

(65) Prior Publication Data
US 2010/0141869 A1    Jun. 10, 2010

(51) Int. Cl.
*G02F 1/1335* (2006.01)
(52) U.S. Cl. ......................................................... 349/67
(58) Field of Classification Search ................... 349/62, 349/67, 64, 112, 114, 58; 362/560–561
See application file for complete search history.

(56) References Cited

U.S. PATENT DOCUMENTS

| | | |
|---|---|---|
| 3,828,909 A | 8/1974 | Roamo et al. |
| 3,838,565 A | 10/1974 | Carlyle |
| 3,838,909 A | 10/1974 | Fitzgibbons |
| 3,966,303 A | 6/1976 | Yamamoto |
| 4,176,084 A | 11/1979 | Luckenbach |
| 4,289,383 A | 9/1981 | Schwarzschild |
| 4,298,249 A | 11/1981 | Gloor et al. |
| 4,635,128 A | 1/1987 | Toyoda |
| 5,099,343 A | 3/1992 | Margerum et al. |
| 5,211,463 A | 5/1993 | Kalmanash |
| 5,412,492 A | 5/1995 | Zammit et al. |
| 5,442,522 A | 8/1995 | Kalmanash |
| 5,479,276 A | 12/1995 | Herbermann |
| 5,479,328 A | 12/1995 | Lee et al. |
| 5,510,915 A | 4/1996 | Ge et al. |
| 5,521,465 A | 5/1996 | Budzilek et al. |
| 5,739,876 A | 4/1998 | Stewart |
| 5,760,760 A | 6/1998 | Helms |
| 5,777,704 A | 7/1998 | Selker |
| 5,786,801 A | 7/1998 | Ichise |
| 5,818,553 A | 10/1998 | Koenck et al. |
| 5,986,728 A | 11/1999 | Bernard |
| 6,034,750 A | 3/2000 | Rai et al. |
| 6,184,946 B1 | 2/2001 | Ando et al. |

(Continued)

FOREIGN PATENT DOCUMENTS

CN        101349833        1/2009

(Continued)

OTHER PUBLICATIONS

U.S. Appl. No. 60/939,083, filed May 19, 2008, Titled White Light Backlights and the Like with Efficient Utilization of Colored LED Source.

*Primary Examiner* — James Dudek (57) ABSTRACT

A passive daylight-coupled display having an LCD panel, a diffuser, and a curved reflector behind the LCD panel. For passive backlighting, the diffuser transmits daylight to the reflector, which reflects the daylight to the LCD panel and provides for substantially uniform distribution of the daylight on the LCD panel for backlighting it. A hybrid display includes both a passive backlight and an active backlight for providing backlighting from an active light source.

39 Claims, 9 Drawing Sheets

U.S. PATENT DOCUMENTS

| | | |
|---|---|---|
| 6,273,577 B1 | 8/2001 | Goto et al. |
| 6,428,198 B1 | 8/2002 | Saccomanno et al. |
| 6,447,132 B1 | 9/2002 | Harter, Jr. |
| 6,592,232 B2 | 7/2003 | McGowan |
| 6,771,331 B1 | 8/2004 | Kubota et al. |
| 6,795,137 B1 | 9/2004 | Whitted et al. |
| 6,929,392 B2 | 8/2005 | Kim et al. |
| 6,961,108 B2 | 11/2005 | Wang et al. |
| 7,027,113 B2 | 4/2006 | Kim et al. |
| 7,121,710 B2 | 10/2006 | Kim et al. |
| 7,213,955 B1 | 5/2007 | Ladouceur et al. |
| 7,306,356 B1 | 12/2007 | Ahmadi |
| 7,427,140 B1 | 9/2008 | Ma |
| 7,430,349 B2 | 9/2008 | Jones |
| 7,510,288 B2 | 3/2009 | Shin et al. |
| 7,513,642 B2 * | 4/2009 | Sormani ............... 362/245 |
| 7,522,775 B2 | 4/2009 | Boon |
| 2002/0114147 A1 | 8/2002 | Harter, Jr. |
| 2003/0095397 A1 | 5/2003 | McGowan |
| 2003/0193457 A1 | 10/2003 | Wang et al. |
| 2003/0201702 A1 | 10/2003 | Kim et al. |
| 2003/0204977 A1 | 11/2003 | Hong |
| 2004/0181989 A1 | 9/2004 | Miller |
| 2004/0252940 A1 | 12/2004 | Atac et al. |
| 2004/0263720 A1 | 12/2004 | Wang et al. |
| 2005/0018106 A1 | 1/2005 | Wang et al. |
| 2005/0146651 A1 | 7/2005 | Whitted et al. |
| 2006/0002140 A1 | 1/2006 | Kim et al. |
| 2007/0091635 A1 | 4/2007 | Ladouceur et al. |
| 2007/0171322 A1 | 7/2007 | Shin et al. |
| 2007/0195519 A1 | 8/2007 | Shin et al. |
| 2007/0200972 A1 | 8/2007 | Ladouceur et al. |
| 2007/0273680 A1 | 11/2007 | Yang et al. |
| 2008/0064096 A1 | 3/2008 | Renauld et al. |
| 2008/0064115 A1 | 3/2008 | Hiramatsu et al. |
| 2008/0064133 A1 | 3/2008 | Lee et al. |
| 2008/0117346 A1 | 5/2008 | Jepson |
| 2008/0201999 A1 | 8/2008 | Chung et al. |
| 2008/0266850 A1 | 10/2008 | Masri |
| 2009/0027591 A1 | 1/2009 | Hwang et al. |
| 2009/0027921 A1 | 1/2009 | Chou et al. |
| 2009/0061945 A1 | 3/2009 | Ma |
| 2009/0213041 A1 | 8/2009 | Unger et al. |
| 2010/0073791 A1 | 3/2010 | Mahowald |
| 2010/0141869 A1 | 6/2010 | Biernath et al. |

FOREIGN PATENT DOCUMENTS

| | | |
|---|---|---|
| DE | 3834492 | 10/1988 |
| EP | 0 399 506 | 5/1990 |
| FR | 2866464 | 2/2004 |
| GB | 2 370 404 | 6/2002 |
| GB | 2 405 252 | 2/2005 |
| JP | 09-297305 | 11/1997 |
| JP | 10-48614 | 2/1998 |
| JP | 10-48615 | 2/1998 |
| JP | 10-123507 | 5/1998 |
| JP | 10-48615 | 9/1998 |
| JP | 11-202784 | 7/1999 |
| JP | 2002-150822 | 5/2002 |
| JP | 2006/189609 | 7/2006 |
| KR | 2003-0000200 | 1/2003 |
| KR | 2006-071000 | 6/2006 |
| KR | 2008-089709 | 4/2007 |
| KR | 2009-008928 | 1/2009 |
| TW | 2006/19758 | 6/2006 |

\* cited by examiner

PASSIVE AND HYBRID DAYLIGHT-COUPLED BACKLIGHTS FOR SUNLIGHT VIEWABLE DISPLAYS

BACKGROUND

Sunlight viewability of digital displays, such as a liquid crystal display (LCD), is increasing in business importance as such displays become more ubiquitous. Advertisers desire the ability to use digital media in outdoor environments, and consumers would like their electronics to be usable everywhere. Current solutions to the outdoor sunlight visibility problem fall short because of insufficient brightness or excessive power consumption and its resultant heat load. For example, one solution achieves 2000 nits brightness by using 720 three watt LEDs in a 40 inch display, which requires a liquid cooling system to dissipate the 2.1 kW of heat. Also, the system weighs 110 lbs., a significant amount of weight for such a display.

SUMMARY

A passive daylight-coupled display, consistent with the present invention, includes an LCD panel having a top side and a bottom side, a diffuser having a front edge adjacent the top side of the LCD panel and having a back edge, and a curved reflector having a top side adjacent the back edge of the diffuser and having a bottom side adjacent the bottom side of the LCD panel. The diffuser transmits daylight to the reflector, and the reflector reflects the daylight to the LCD panel and provides for substantially uniform distribution of the daylight on the LCD panel.

A multi-unit passive daylight-coupled display, consistent with the present invention, includes a first LCD panel having a top side and a bottom side and a second display panel located opposite the first LCD panel and having a top side and a bottom side. A diffuser has a front edge adjacent the top side of the first LCD panel and a back edge adjacent the top side of the second display panel. A first reflector has a top side adjacent the front edge of the diffuser and a bottom side adjacent the bottom side of the second display panel, and a second reflector has a top side adjacent the back edge of the diffuser and a bottom side adjacent the bottom side of the first LCD panel. The diffuser transmits daylight to the reflectors. The first reflector reflects the daylight to the second display panel and provides for substantially uniform distribution of the daylight on the second display panel, and the second reflector reflects the daylight to the first LCD panel and provides for substantially uniform distribution of the daylight on the first LCD panel.

Another multi-unit passive daylight-coupled display, consistent with the present invention, includes an LCD panel having a top side and a bottom side. A diffuser has a front edge adjacent the top side of the first LCD panel and a back edge. A first partial reflector has a top side adjacent the back edge of the diffuser and a bottom side adjacent approximately the mid-point of the LCD panel, and a second reflector has a top side adjacent the back edge of the diffuser and a bottom side adjacent the bottom side of the LCD panel. A polarization rotator is located behind the LCD panel from approximately the mid-point of the LCD panel to the bottom side of the LCD panel, or alternatively from approximately the mid-point of the LCD panel to the top side of the LCD panel. The diffuser transmits daylight to the reflector. The first reflector reflects a portion of the daylight to a top portion of the LCD panel and provides for substantially uniform distribution of the daylight on the top portion of the LCD panel, and the second reflector reflects the remaining daylight to a bottom portion of the LCD panel and provides for substantially uniform distribution of the daylight on the bottom portion of the LCD panel.

Another multi-unit passive daylight-coupled display, consistent with the present invention, includes a first LCD panel having a top side and a bottom side and a second LCD panel having a top side located adjacent the bottom side of the first LCD panel and having a bottom side. A diffuser has a front edge adjacent the top side of the first LCD panel and a back edge. A first partial reflector has a top side adjacent the back edge of the diffuser and a bottom side adjacent the bottom side of the first LCD panel, and a second reflector has a top side adjacent the back edge of the diffuser and a bottom side adjacent the bottom side of the second LCD panel. The diffuser transmits daylight to the reflector. The first partial reflector reflects a portion of the daylight to the first LCD panel and provides for substantially uniform distribution of the daylight on the first LCD panel, and the second reflector reflects the remaining daylight to the second LCD panel and provides for substantially uniform distribution of the daylight on the second LCD panel. The second LCD panel is inverted with respect to the first LCD panel to effect the correct polarization orientation. Alternatively, a polarization rotator plate or film can be used.

In the multi-unit displays, one or both of the LCD panels can be replaced with a static display panel.

A hybrid daylight-coupled display, consistent with the present invention, includes an LCD panel having a top side and a bottom side, a diffuser having a front edge adjacent the top side of the LCD panel and having a back edge, and a reflector having a top side adjacent the back edge of the diffuser and having a bottom side adjacent the bottom side of the LCD panel. The diffuser transmits daylight to the reflector, and the reflector reflects the daylight to the LCD panel and provides for substantially uniform distribution of the daylight on the LCD panel. The display also includes an active backlight for providing, when activated, substantially uniform distribution of light on the LCD panel and to enable operation in low daylight or ambient conditions (cloudy) and at nighttime.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Using sunlight as a source of illumination for a display helps to save electrical power, enabling a more energy-efficient display. The daylight-coupled backlight provides a daylight-viewable solution that is potentially solar powered and also produces a high brightness display. At night-time or other low ambient light conditions, the backlight can be supplemented with an active light source. By using the sun to light the backlight, it saves a substantial power load and enables an energy efficient display, daylight viewable solution that is potentially completely solar powered and also produces a high brightness display.

Daylight-coupled LCD devices can be used in a variety of outdoor settings for digital signage, traffic signage, or to display of other types of information. The devices can be housed in a kiosk or other types of enclosures depending upon, for example, a desired use of the devices. The devices can be used on bus shelters, sides of buildings, trucks, trailers, or other outdoor locations for advertisement or other information presentation. They can also be used in a variety of indoor settings to display information or advertisement in store-front windows, high-ambient mall courtyards, or other locations. They can also be used inside of a car to display information on the center stack, driver cluster or dashboard. They can be mounted on the backside of the headrests or from the ceiling to display entertainment within a vehicle. The devices can also be in a smaller form factor as well—display diagonals less than 7 inches. The display panels in the devices can be arranged in a portrait mode or a landscape mode for display of information.

The term LCD is used here to represent the variety of liquid crystal panels currently available on the market and those that may become available in the future, including, but not limited to conventional TN panels; PVA, MVA or OCB mode panels; and transflective panels. Additionally, the LCD panels may be substituted with other backlit light-valve type displays, other backlit electronic displays, electronic signage, or static signage. The backlight can be designed to be collapsible so that it functions as a more conventional backlight in its collapsed state, but by means of hinges, springs, or slides, rearranges to form the backlight described in the present specification. Additionally, it may be designed to be collapsible for purposes of transportation or storage.

Preferably, highly reflective specular films are used throughout the cavity. However, optionally, diffusers may be added at various locations, such as behind the LCD panel, for example, to hide seams or interfaces between components. All diffusers in the system, including the entrance aperture, may be passive such as bead coated films and bulk diffuser plates, or they may be actively controlled such as PDLC (Polymer Dispersed Liquid Crystal) films or plates, for example.

Passive Daylight-Coupled Display

Figure 1:
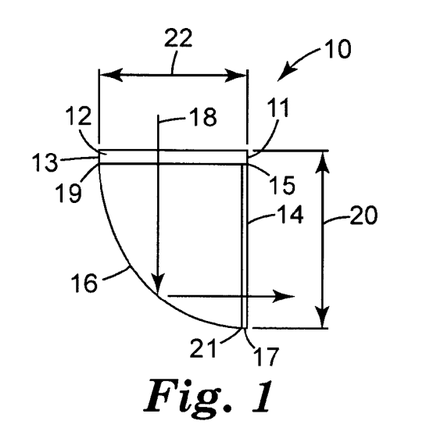
FIG. 1 is a side view of a first daylight-coupled LCD device.
Figure 2:
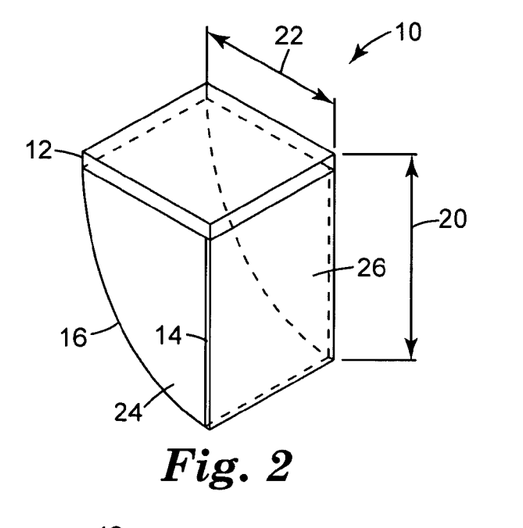
FIG. 2 is a perspective view of the daylight-coupled LCD device of FIG. 1.

FIG. 1 is a side view of a first daylight-coupled LCD device 10, and FIG. 2 is a perspective view of the daylight-coupled LCD device 10. Device 10 includes an LCD panel 14 having a top side 15 and a bottom side 17, a diffuser 12 having a front edge 11 and a back edge 13, a curved reflector 16 having a top side 19 and a bottom side 21, and side panels 24 and 26. Device 10 has a height 20 and depth 22.

As represented by arrow 18, diffuser 12 transmits at least some daylight to reflector 16 and possibly to other components. Reflector 16 then reflects the light upon LCD panel 14 in order to provide backlighting for the LCD panel. Device 10 is designed with a depth 22 and curvature of reflector 16 such that reflector 16 provides for substantially uniform distribution of the reflected daylight onto LCD panel 14. With a circular shape for reflector 16, meaning that it forms a portion of a circle, the ratio of the height 20 to depth 22 is approximately 1 to 1. In other embodiments, particular if a turning film is used behind the LCD panel, the ratio of the height of the LCD panel to the depth of the diffuser is approximately 1 to 0.5. A stacked reflector configuration can realize a preferred ratio of 1 to 0.375. In device 10, and in other daylight-coupled LCD devices, diffuser 12 is preferably positioned at an angle of approximately 90° with respect to LCD panel 14, although the angle can be greater than 120° and can also be less than 90°.

By using daylight for passive backlighting, the device can be used during the daytime in outdoor settings without the need for an active light source, thus saving power and reducing heat load on the device. To maintain brightness, an active light source can be used during cloudy conditions. If brightness under cloudy or dim ambient lighting is not a concern, then an active light source is not needed. In addition to using sunlight, the device 10 can use other external light sources for passive backlighting, such as streetlights, spotlights, projectors, or overhead fluorescent lights. All the external light sources can be combined and concentrated for the passive backlight using, for example, lenses, light pipes, mirrors, or ambient light concentrators.

Figure 3:
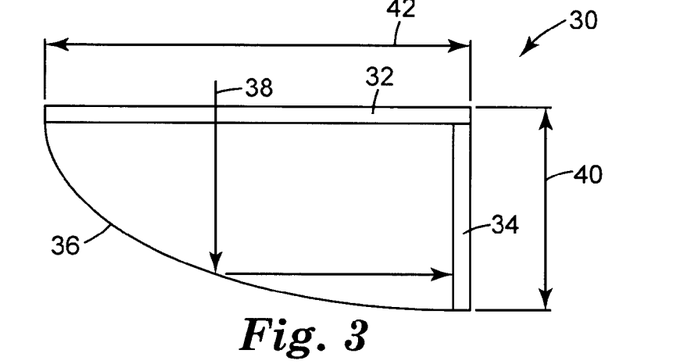
FIG. 3 is a side view of a second daylight-coupled LCD device.
Figure 4:
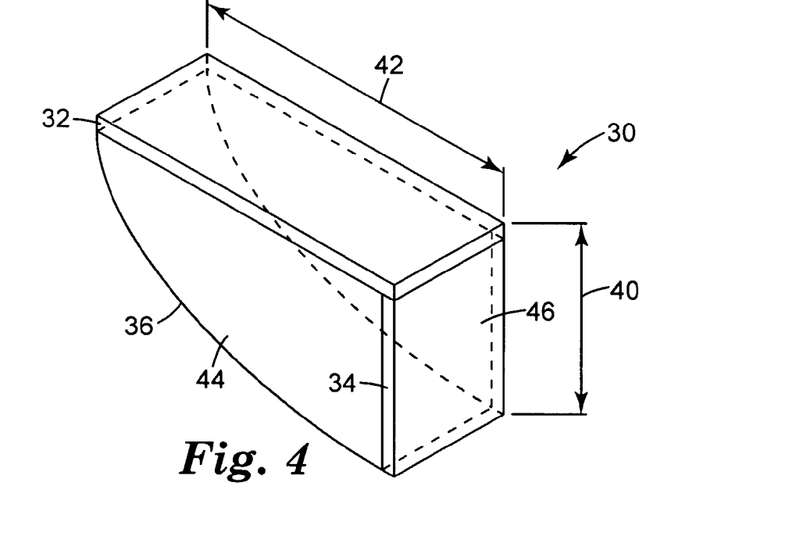
FIG. 4 is a perspective view of the daylight-coupled LCD device of FIG. 3.

FIG. 3 is a side view of a second daylight-coupled LCD device 30, and FIG. 4 is a perspective view of the daylight-coupled LCD device 30. Device 30 includes an LCD panel 34, a diffuser 32, a curved reflector 36, and side panels 44 and 46. Device 30 has a height 40 and depth 42.

As represented by arrow 38, diffuser 32 transmits at least some daylight to reflector 36 and possibly to other components. Reflector 36 then reflects the light upon LCD panel 34 in order to provide backlighting for the LCD panel. Device 30 is designed with a depth 42 and curvature of reflector 36 such that reflector 36 provides for substantially uniform distribution of the reflected daylight onto LCD panel 34. Having a deeper diffuser cavity, such as that shown in device 30 in comparison to device 10, can allow the diffuser to collect more light for the reflector and backlighting of the LCD panel, thereby enabling a wider viewing angle both horizontally and vertically. With a parabolic shape for reflector 36, meaning that it forms a portion of a parabola, the ratio of the height 40 to depth 42 can be approximately 1 to 3.

Although circular and parabolic shapes are shown for the reflectors, other shapes are possible, including a three-dimensional (3D) curvature or a straight reflector. Also, the shape of the reflector can be variable. For a shaped reflector, it is preferably shaped as a section of a parabola and is arranged with edges meeting the diffuser and LCD panel at an angle of approximately 20° to axes normal to the diffuser and LCD panel.

The diffusers in daylight-coupled LCD devices, such as diffusers 12 and 32, can be implemented with, for example, one or more of the following: beaded gain diffusers; microstructured gain diffusers; diffuser sheet materials such as bulk diffusers (particle filled or microcavitated); or diffuser plates. The diffuser can optionally be domed or faceted for concentrating the daylight or other light source. Diffusers 12 and 32 preferably block ultraviolet (UV) light, and reflectors 16 and 36 preferably transmit infrared (IR) light to avoid heat loading on the LCD device. The diffusers can provide sufficient diffusion of light to achieve uniform backlighting, and the diffusers typically transmit as least 50% and more preferably at least 70% of the visible light incident upon them, while exhibiting low clarity as measured by the Haze-Gard product available from BYK-Gardner USA.

The reflectors in daylight-coupled LCD devices, such as reflectors 16 and 36, can be implemented with, for example, one or more of the following: an Enhanced Specular Reflector (ESR) film available from 3M Company; a reflective polarizing film; or the silvered or aluminized Mylar product available from E. I. DuPont DeNemours and Company. Use of the ESR film, or other reflective films that transmit IR light, leads to a decrease in the temperature of the LCD panel since the panel does not end up absorbing that IR light. Reflectors 16 and 36 preferably transmit infrared (IR) light to avoid heat loading on the LCD device. The reflector can optionally be faceted or coated to provide for particular visual effects and can also optionally include a bead coated or microstructured coated ESR film. The reflector films can be supported by, for example, polymethyl methacrylate (PMMA) or other plastic plate, ESR film on stainless steel, or aluminum if additional mechanical support is desired. If a metal support or other material that reflects IR is used to support the ESR film, then it is preferable to reject IR before it enters the backlight cavity, for example using an IR mirror film, such as the Prestige product available from 3M Company, on or under the diffuser plate, to reject the incident IR light. The reflectors preferably have a smooth curved shape when in use, although a curved shape having non-smooth portions can also be used. The reflectors are preferably specular and better than 80% reflective in the visible, and more preferably 90% or higher, and most preferably 98% or higher reflectivity. An example of such a film is the ESR film.

The side panels in daylight-coupled LCD devices, such as panels 24, 26, 44, and 46, can be implemented with, for example, the following: ESR film; a Lambertian reflector; a reflective fabric; or a diffuser plate. The panels can be implemented with separate components. Alternatively, the side panels and reflector can be formed together as a 3D cavity such as with a thermoformed reflector cavity.

The diffuser, reflector, and side panels in daylight-coupled LCD devices can be held together with a frame, for example. The components of the daylight-coupled LCD device can be adjacent one another by being in direct contact, by being connected through one or more other components such as a frame, or by being held next to one another.

Devices 10 and 30, and other daylight-coupled LCD devices, can include additional films on the front of the LCD panel. Examples of those additional films include the following: a shatter protection film such as the anti-splinter film product available from 3M Company; an anti-glare film; an IR filter film such as the Prestige or Crystalline film products available from 3M Company; and as a single film with multiple functionalities. Likewise, additional films may be used directly on or under the diffuser plate to provide UV protection, IR protection, shatter protection, and color correction. Additional films could also be included on the back of the LCD panel, either near, adjacent, or in contact with it. Examples of these films include the following: reflective polarizer film such as the DBEF product available from 3M Company; DBEF with a diffuse adhesive; and microreplicated films.

Figure 5:
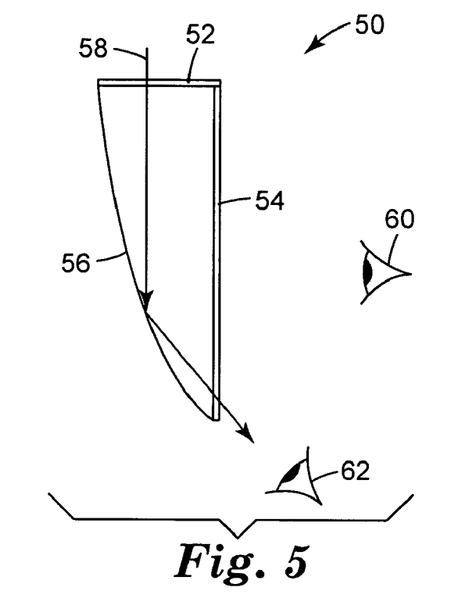
FIG. 5 is a side view of a daylight-coupled LCD device for elevated applications.
Figure 6:
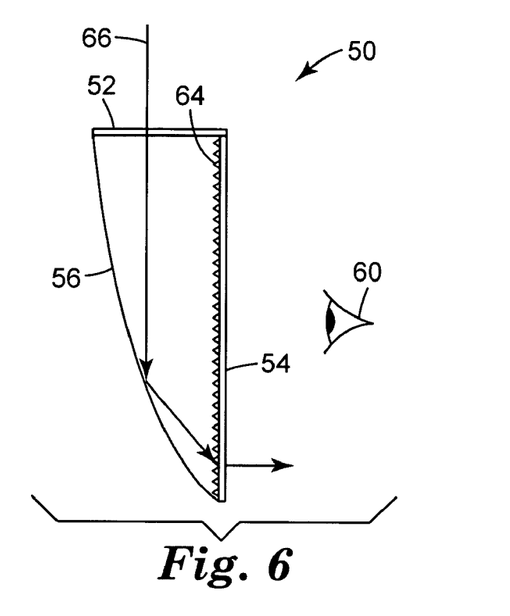
FIG. 6 is a side view of a daylight-coupled LCD device with a turning film.

FIG. 5 is a side view of a daylight-coupled LCD device 50 for elevated applications. Device 50 includes an LCD panel 54, a diffuser 52, and a curved reflector 56. With the depth of the cavity less than the height (for example, a height to depth ratio of 1 to 0.5) of the LCD panel, as illustrated in FIG. 5, daylight as represented by arrow 58 will be reflected downward by reflector 56, making it difficult for a viewer 60 to see the displayed information when looking directly at the LCD panel 54 rather than at an angle to it. Therefore, device 50 can be useful for an elevated outdoor display where a viewer 62 is looking up at the LCD panel 54. Optionally, the device 50 may be tilted toward the viewer. In order to accommodate a viewer 60, as illustrated in FIG. 6, daylight-coupled LCD device 50 can include a turning film 64 behind LCD panel 54 such that daylight as represented by arrow 66 is reflected and transmitted through LCD panel 54 at approximately a normal angle to it. Turning film 64 can be a prismatic microstructured film with symmetric or asymmetric facets designed to capture the incident light and turn it toward the viewer. Optionally, the turning film can be a beaded gain diffuser or bulk diffuser, and it can include a gradient extraction pattern.

Figure 7:
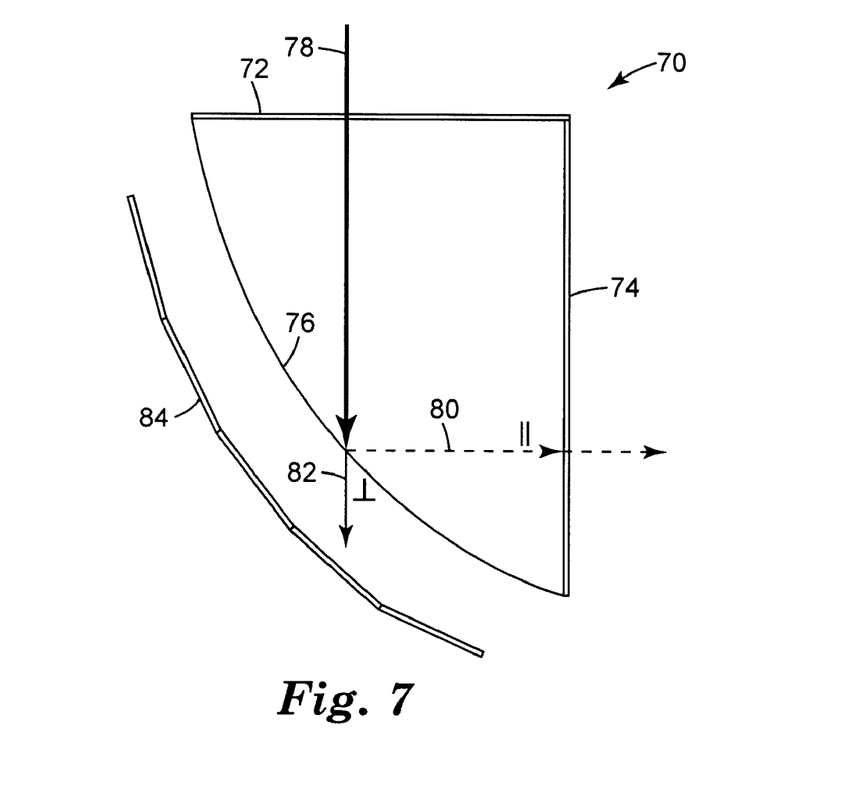
FIG. 7 is a side view of a first daylight-coupled LCD device with solar cells.

FIG. 7 is a side view of a first daylight-coupled LCD device 70 with solar cells 84. Device 70 includes an LCD panel 74, a diffuser 72, and a curved reflector 76. Device 70 can operate in a manner similar to device 10. Solar cells 84 are positioned adjacent and behind reflector 76, which is implemented with a reflective polarizing film such as the DBEF product available from 3M Company. Therefore, daylight as represented by arrow 78 is transmitted by diffuser 72 to reflector 76, and light of a first polarization 80 is reflected to LCD panel 74 to provide backlighting for it, and light of a second polarization 82 is transmitted through reflector 76 to solar cells 84. In device 70, solar cells 84 are preferably located such that they are near to or in contact with reflector 76. The solar cells 84 can provide power to assist in operation of LCD panel 74, or they can be used to recharge a battery supplying power to the LCD panel, driving electronics or an active light source. The use of a reflective polarizer as the back reflector 76 leads to a decrease in the temperature of the LCD panel 74, since the panel 74 does not absorb the second polarization of light 82, which can increase the lifetime of the LCD panel.

Figure 8:
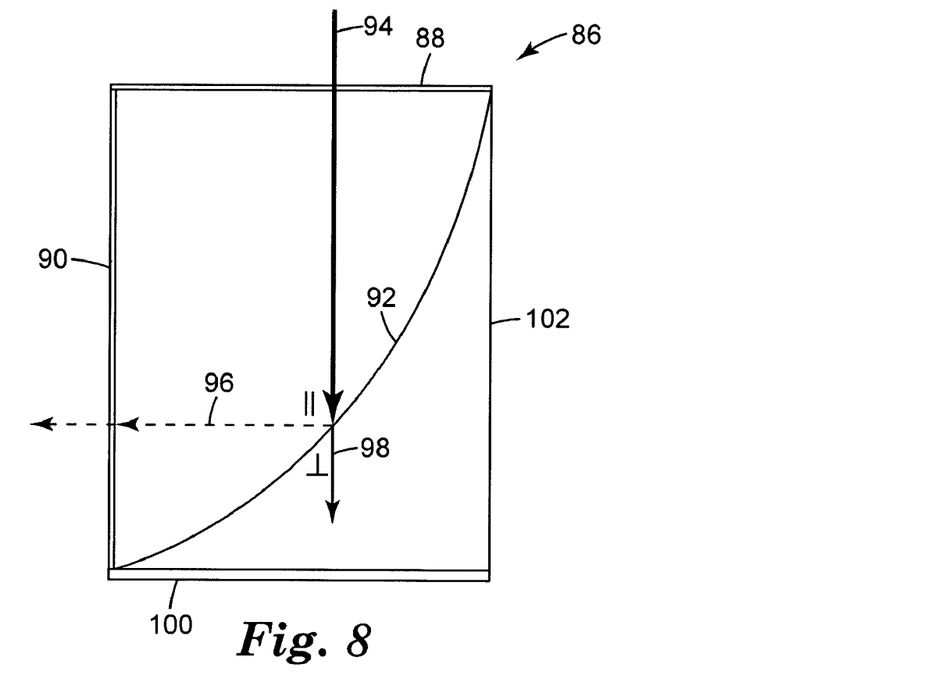
FIG. 8 is a side view of a second daylight-coupled LCD device with solar cells.

FIG. 8 is a side view of a second daylight-coupled LCD device 86 with solar cells 100. Device 86 includes an LCD panel 90, a diffuser 88, and a curved reflector 92. Device 86 can operate in a manner similar to device 10. Solar cells 100 are positioned behind and below reflector 92, which is implemented with a reflective polarizing film. Therefore, daylight as represented by arrow 94 is transmitted by diffuser 88 to reflector 92, and light of a first polarization 96 is reflected to LCD panel 90 to provide backlighting for it, and light of a second polarization 98 is transmitted through reflector 92 to solar cells 100. This embodiment also includes a reflector 102 to reflect additional light from reflector 92 down to solar cells 100. The solar cells 100 can provide power to assist in operation of LCD panel 90, or they can be used to recharge a battery supplying power to the LCD panel, driving electronics, or an active light source. Device 86 allows for use of a smaller solar cell in comparison to device 70.

In devices 70 and 86, the solar cells can be implemented with, for example, photovoltaic solar cells.

Alternatively for the embodiment shown in FIG. 8, a partially transmissive reflector 102 may be substituted for reflector 102. Graphics may be applied to partially transmissive reflector 102 such as a diffuser plate, for example, thereby enabling backlighting of static display panels using the daylight that enters through the top diffuser 88. Solar cells 100 may remain, or be substituted with a reflector such as the ESR film or a more Lambertian reflector such as the LEF product available from 3M Company.

Multi-Unit Daylight-Coupled Display

Figure 9:
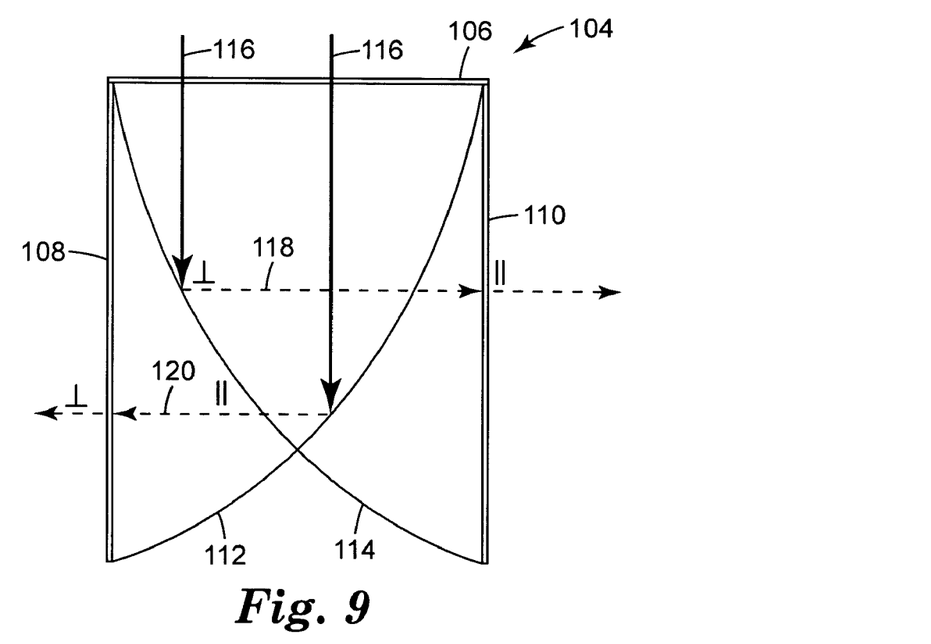
FIG. 9 is a side view of a doubled-sided daylight-coupled LCD device.

FIG. 9 is a side view of a doubled-sided daylight-coupled LCD device 104. Device 104 includes a first LCD panel 108, a second display panel 110, a diffuser 106, a first curved reflector 112, and a second curved reflector 114. Display panel 110 can be implemented with an LCD panel or a static display panel. The curved reflectors 112 and 114 are implemented with reflective polarizing films. As represented by arrow 116, diffuser 106 transmits daylight to reflectors 112 and 114. Reflector 112 reflects light of a first polarization 120 to first LCD panel 108 to provide backlighting for LCD panel 108. Reflector 114 reflects light of a second polarization 118 to second display panel 110 to provide backlighting for display panel 110. Reflectors 112 and 114 transmit light not reflected such that the reflectors can provide for substantially uniform distribution of the reflected daylight onto LCD panel 108 and display panel 110, respectively. This distribution can result in the same brightness being display on each panel. To provide for the junction point of reflectors 112 and 114, one of the reflectors can be formed from two pieces with the pieces affixed to the other reflector with tape or an adhesive, for example. The second panel 110 may be flipped relative to panel 108 or a polarization rotator may be used, so that the panel 110 accepts the second polarization 118.

Figure 10:
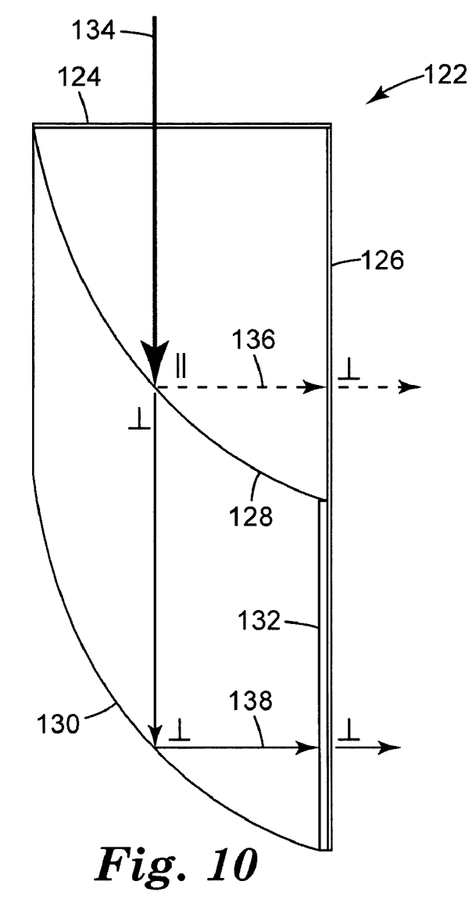
FIG. 10 is a side view of a first stacked daylight-coupled LCD device.

FIG. 10 is a side view of a first stacked daylight-coupled LCD device 122. Device 122 includes an LCD panel 126, a diffuser 124, a first curved reflector 128, and a second curved reflector 130. The first curved reflector 128 is located between a back side of diffuser 124 and approximately a mid-point of LCD panel 126. The curved reflector 128 is implemented with reflective polarizing film, and reflector 130 is implemented with a specular reflector such as the ESR film or silvered or aluminized plastic. As represented by arrow 134, diffuser 124 transmits daylight to reflectors 128 and 130. Reflector 128 reflects light of a first polarization 136 to LCD panel 126 to provide backlighting for an upper portion of LCD panel 126. Reflector 130 reflects light of a second polarization 138 to LCD panel 126 to provide backlighting for a lower portion of LCD panel 126. Reflector 128 transmits light of the second polarization 138 such that the reflectors 128 and 130 can provide for substantially uniform distribution of the reflected daylight onto the top and bottom portions of LCD panel 126, respectively. Device 122 also includes a polarization rotator 132 positioned adjacent and behind the lower portion of LCD panel 126 to provide the correct polarization of light for backlighting the lower portion.

Figure 11:
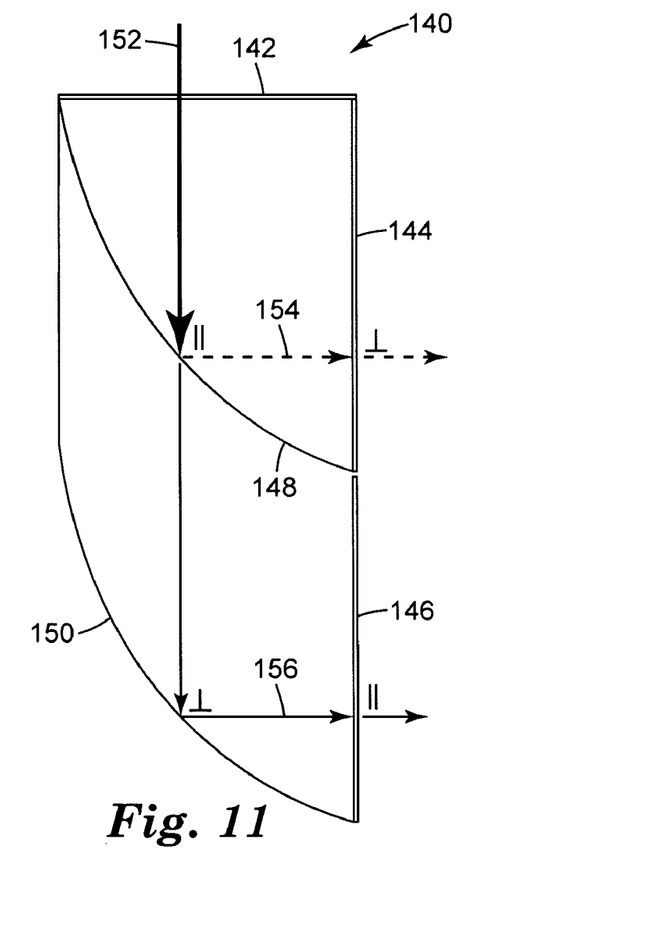
FIG. 11 is a side view of a second stacked daylight-coupled LCD device.

FIG. 11 is a side view of a second stacked daylight-coupled LCD device 140. Device 140 includes a first LCD panel 144, a second LCD panel 146, a diffuser 142, a first curved reflector 148, and a second curved reflector 150. The curved reflector 148 is implemented with reflective polarizing film. Reflector 150 is implemented with a specular reflector such as the ESR film or silvered or aluminized plastic. As represented by arrow 152, diffuser 142 transmits daylight to reflectors 148 and 150. Reflector 148 reflects light of a first polarization 154 to LCD panel 144 to provide backlighting for LCD panel 144. Reflector 150 reflects light of a second polarization 156 to LCD panel 146 to provide backlighting for LCD panel 146. Reflector 148 transmits light of the second polarization 156 such that the reflectors 148 and 150 can provide for substantially uniform distribution of the reflected daylight onto LCD panels 144 and 146, respectively. The second panel 146 may be inverted or "flipped" relative to panel 144, so that the panel 146 accepts the second polarization 156.

In the multi-unit daylight-coupled displays using two LCD panels device 140, one of the LCD panels (or both or a portion of or perimeter around them) can optionally be replaced with a static display panel or display panel illuminated by the backlight cavity. In the multi-unit displays, the two panels, two LCD panels, two static display panels, or an LCD panel with a static display panel, are preferably of substantially equal brightness when in operation, although they need not have the same brightness.

Hybrid Daylight-Coupled Display

Figure 12:
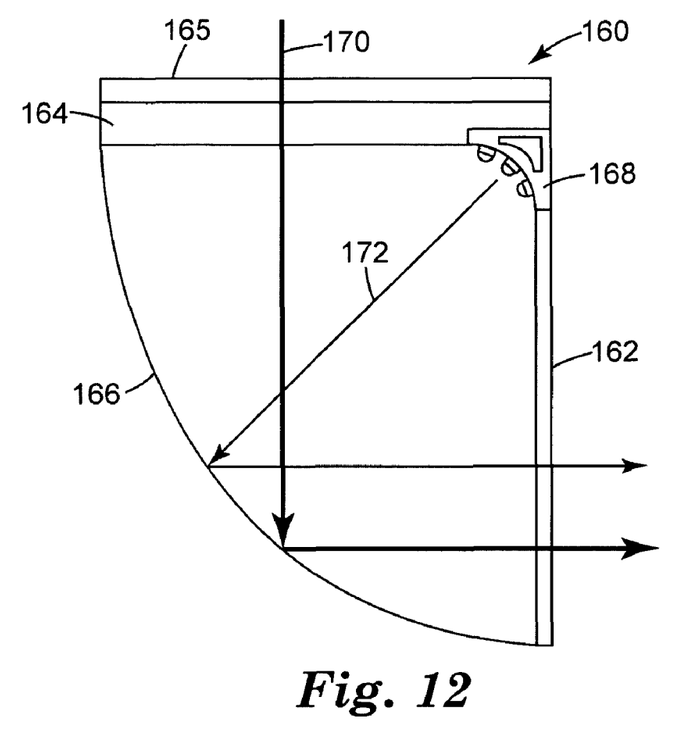
FIG. 12 is a side view of a hybrid daylight-coupled LCD device.

FIG. 12 is a side view of a hybrid daylight-coupled LCD device 160. Device 160 includes an LCD panel 162, a diffuser 164, a curved reflector 166, and a light source 168 located at the juncture of LCD panel 162 and diffuser 164. Light source 168 can be implemented within a corner bracket, for example. Device 160 can operate in a manner similar to device 10 for passive backlighting, and device 160 also has an active backlight for operation at night-time or low ambient light conditions. As represented by arrow 170, for passive backlighting diffuser 164 transmits daylight to reflector 166, which reflects the light upon LCD panel 162 in order to provide backlighting for the LCD panel. For active backlighting, light source 168 transmits light to reflector 166 as represented by arrow 172 to be reflected upon LCD panel 162 for backlighting it. Light source 168 can be implemented with, for example, a light emitting diode (LED) bar. It can be preferable for back reflector 166 to have some degree of optical diffusion, such as gain-diffuser bead coating, microstructured diffuser coating, or other such diffusive overlay to aid in redirecting the light and hide the point light sources. It is preferable for the LEDs to have a narrow emission angle, such as 75° included angle white LEDs from Seoul Semiconductor. Optionally, diffusers may be added at various locations, such as behind the LCD panel, for example, to hide seams or interfaces between components.

Optionally, a shutter 165 can be employed above or below diffuser 164 to prevent light leakage out of the diffuser 164 during times that the active lighting such as 168 is the primary source of light. The shutter 165 can be electronically activated with a control system or manually activated, and it can be implemented electronically, electromechanically, electrochemically, photochemically, or mechanically, combinations thereof and in other ways. Shutter 165 may be implemented by a venetian blind for example, suspended to allow daylight to pass through it when open and reflect light back into the cavity when closed. Other implementations of shutter 165 include, but are not limited to, a barrier plate comprising a film or plate with a black matte surface facing upward and attached ESR film facing downward into the cavity; an electronic light valve; a mechanically rotatable baffle in a light pipe that feeds the top of the diffuser 164; an electrochromic window; or a photo-bleaching window (opposite of photochromic).

It is preferable that the sky-facing portion of shutter 165 be dark and low reflectivity when in its closed state. It is preferable that the portion of shutter 165 that faces in toward the cavity be highly reflective to efficiently return light toward the LCD panel 162.

Where multiple light sources are used, such as the three rows of LEDs 168, these light sources may be positionally uniformly distributed or variably distributed, they may be the same color or different colors, and they may be run at the same power or at varying powers to achieve the desired uniformity, color temperature, and view angle of LCD 162. Multiple different types of light sources and configurations can be combined.

FIGS. 13-20 illustrate examples of other hybrid daylight-coupled LCD devices with various types of active backlights. The devices shown in FIGS. 13-20 can operate in a manner similar to device 10 to provide passive backlighting, and they also have light sources to provide active backlighting. Each of the light sources of the devices shown in FIGS. 13-20 is connected to a power source and controller to provide for the active backlighting. Hybrid daylight-coupled LCD devices can optionally have a light sensor for use in determining when to use the active light source. For example, if the sensor detects daylight of insufficient intensity for desired backlighting, the device can activate the active backlight to provide for the desired backlighting. Other systems in a hybrid daylight-coupled LCD device can be used for color regulation or control in the backlight. For example, a control system can modulate the active light source and can adjust the intensity, color, or distribution of active light source.

Figure 13:
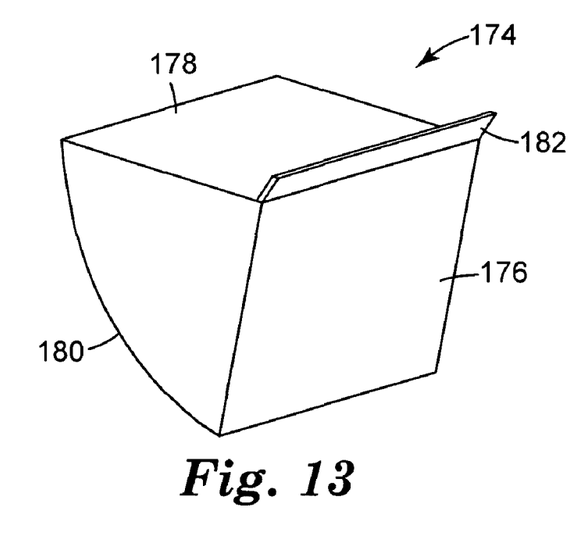
FIG. 13 is a perspective view of a hybrid daylight-coupled LCD device with an LED bar backlight.

FIG. 13 is a perspective view of a hybrid daylight-coupled LCD device 174 having an LCD panel 176, a diffuser 178, a curved reflector 180, and an LED bar 182 located at the juncture of LCD panel 176 and diffuser 178 as the light source for the active backlight.

Figure 14:
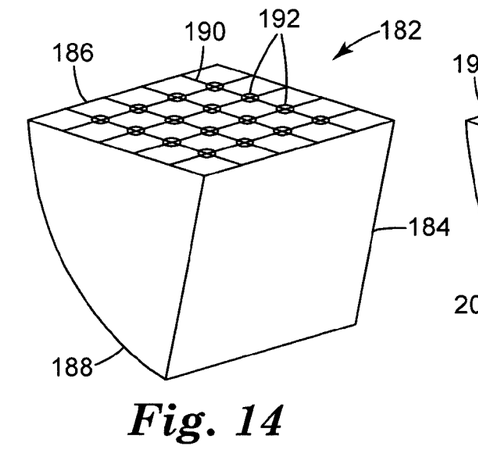
FIG. 14 is a perspective view of a hybrid daylight-coupled LCD device with an LED array backlight.

FIG. 14 is a perspective view of a hybrid daylight-coupled LCD device 182 having an LCD panel 184, a diffuser 186, a curved reflector 188, and an LED array 190 having LEDs 192 located adjacent diffuser 186 as the light source for the active backlight.

Figure 15:
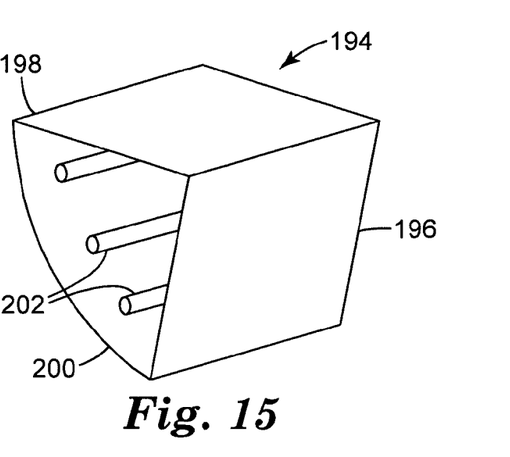
FIG. 15 is a perspective view of a hybrid daylight-coupled LCD device with a CCFL backlight.
Figure 16:
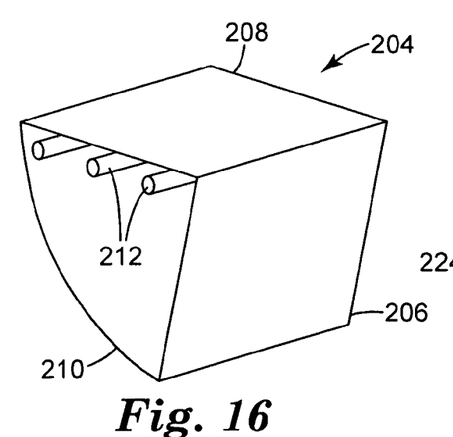
FIG. 16 is a perspective view of a hybrid daylight-coupled LCD device with a CCFL backlight.

FIG. 15 is a perspective view of a hybrid daylight-coupled LCD device 194 having an LCD panel 196, a diffuser 198, a curved reflector 200, and cold cathode fluorescent lamps (CCFLs) 202 located in front of and adjacent reflector 200 as the light source for the active backlight. FIG. 16 is a perspective view of a hybrid daylight-coupled LCD device 204 having an LCD panel 206, a diffuser 208, a curved reflector 210, and CCFLs 212 located underneath and adjacent diffuser 208 as the light source for the active backlight.

Figure 17:
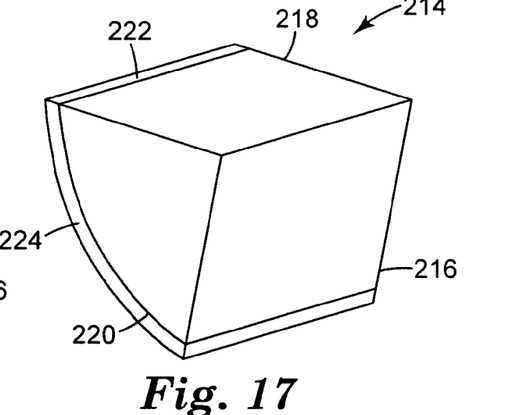
FIG. 17 is a perspective view of a hybrid daylight-coupled LCD device with a hollow back reflector and light injector backlight.

FIG. 17 is a perspective view of a hybrid daylight-coupled LCD device 214 having an LCD panel 216, a diffuser 218, a curved reflector 220, and a hollow 224 back reflector with a light source 222 located behind and adjacent reflector 220 as the light source for the active backlight. Examples of hollow back reflectors with injectors are described in U.S. Patent Applications Publication Nos. 2008/064096, 2008/064115, and 2008/064133, all of which are incorporated herein by reference as if fully set forth.

Figure 18:
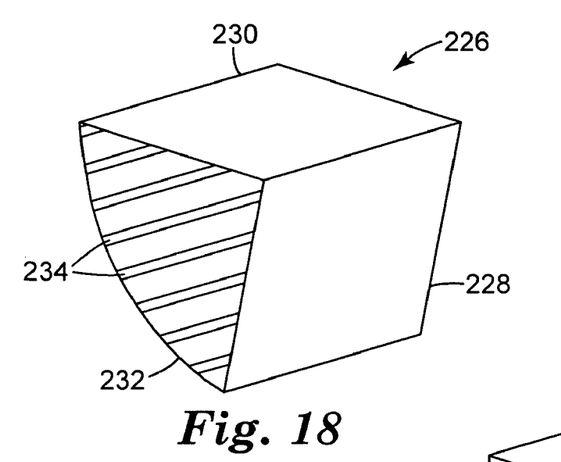
FIG. 18 is a perspective view of a hybrid daylight-coupled LCD device with a film-based injector backlight.
Figure 19:
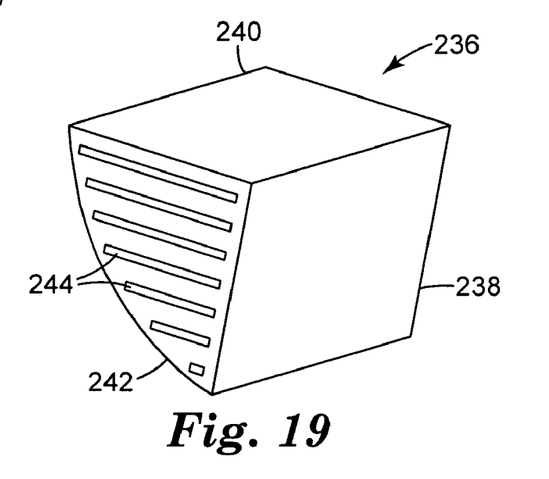
FIG. 19 is a perspective view of a hybrid daylight-coupled LCD device with a film-based injector backlight.

FIG. 18 is a perspective view of a hybrid daylight-coupled LCD device 226 having an LCD panel 228, a diffuser 230, a curved reflector 232, and a film-based LED injector 234 located in front of and adjacent reflector 232 as the light source for the active backlight. FIG. 19 is a perspective view of a hybrid daylight-coupled LCD device 236 having an LCD panel 238, a diffuser 240, a curved reflector 242, and a film-based LED injector 244 located inside and adjacent one or more of the side panels as the light source for the active backlight. An example of a film-based LED injector is described in U.S. Provisional Patent Application Ser. No. 60/939,083, filed May 19, 2008, which is incorporated herein by reference as if fully set forth.

Figure 20:
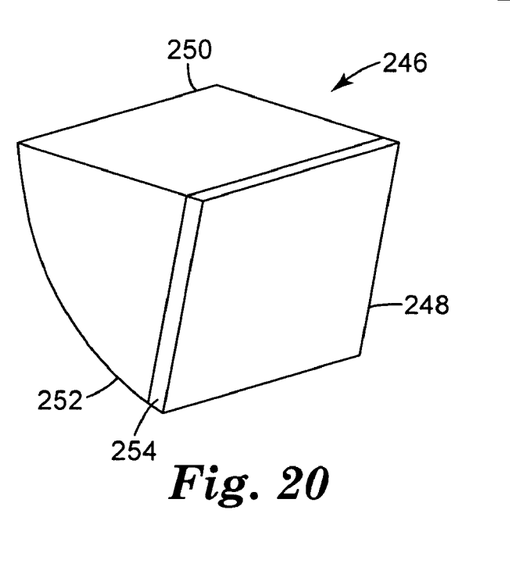
FIG. 20 is a perspective view of a hybrid daylight-coupled LCD device with a transparent light guide extractor plate backlight.

FIG. 20 is a perspective view of a hybrid daylight-coupled LCD device 246 having an LCD panel 248, a diffuser 250, a curved reflector 252, and a transparent light guide extractor plate 254 located behind and adjacent LCD panel 248 as the light source for the active backlight. Additional films may be applied in front of or behind extractor plate 254 to collimate, polarize, or control view angle.

Static Multi-Unit Daylight-Coupled Display

Figure 21:
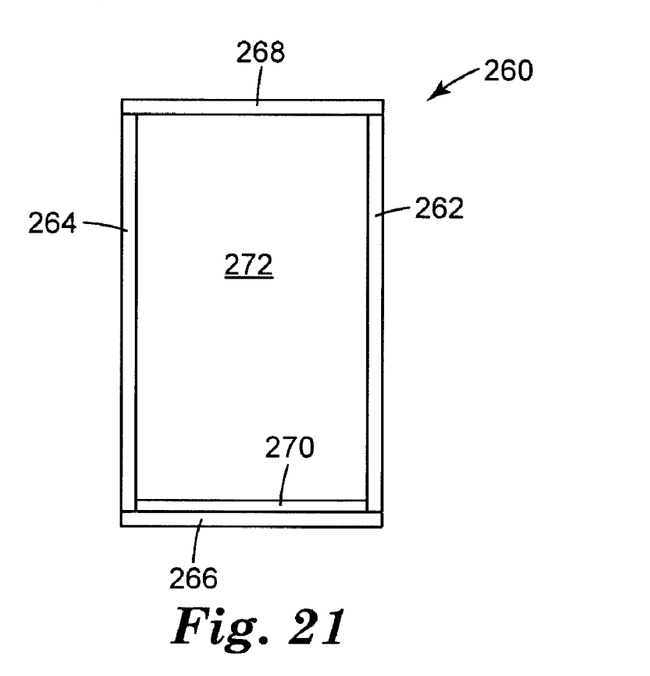
FIG. 21 is a side view of a double-sided daylight-coupled display with static display panels.
Figure 22:
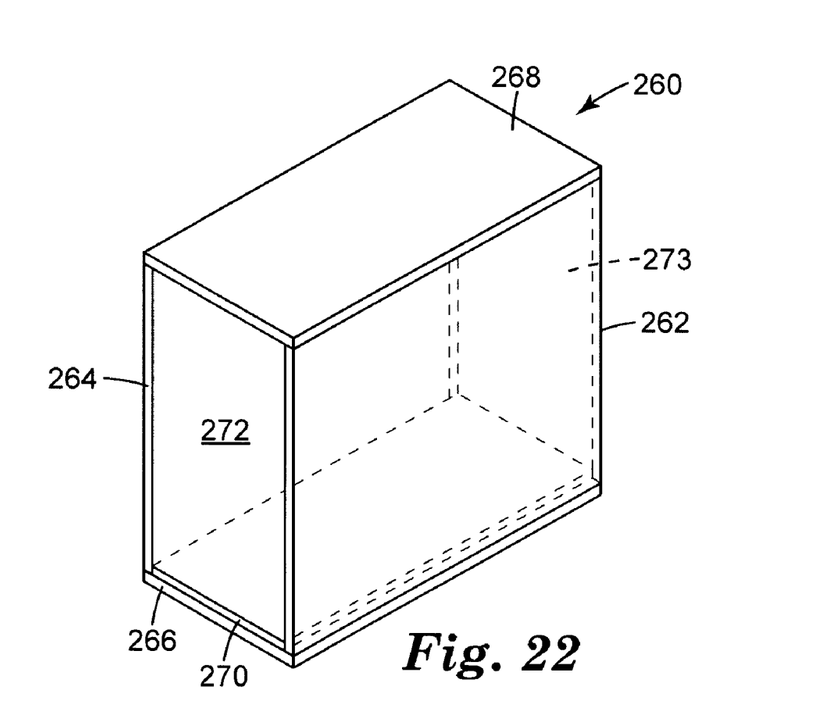
FIG. 22 is a perspective view of the double-sided daylight-coupled display with static display panels of FIG. 21.

FIG. 21 is a side view of a double-sided daylight-coupled display 260 with static display panels 262 and 264. FIG. 22 is a perspective view of display 260. Display 260 also includes a diffuser 268, a bottom panel 266, and side panels 272 and 273. Bottom panel 266 is lined with a reflector 270 such as ESR film or silvered or aluminized plastics. Side panels 272 and 273 are lined with reflectors, such as ESR film or other reflector materials, and are situated such that these reflective sides are facing inside display 260. Diffuser 268 transmits daylight into display 260, and the reflectors on the bottom panel 266 and side panels 272 and 273 provide for backlighting and illumination of static display panels 262 and 264. The configuration of display 260 preferably provides for substantially uniform backlighting of static display panels 262 and 264, uniform enough for sign applications. For greater uniformity, it can use a pair of curved reflectors, as described above, optionally with ESR film lined side panels and without ESR film on the bottom panel. Display 260 can optionally include only one static display panel with ESR film lining the side panels, a back panel, and the bottom panel or the use of a curved reflector with ESR film lined side panels.

Collapsible Passive Backlight

Figure 23:
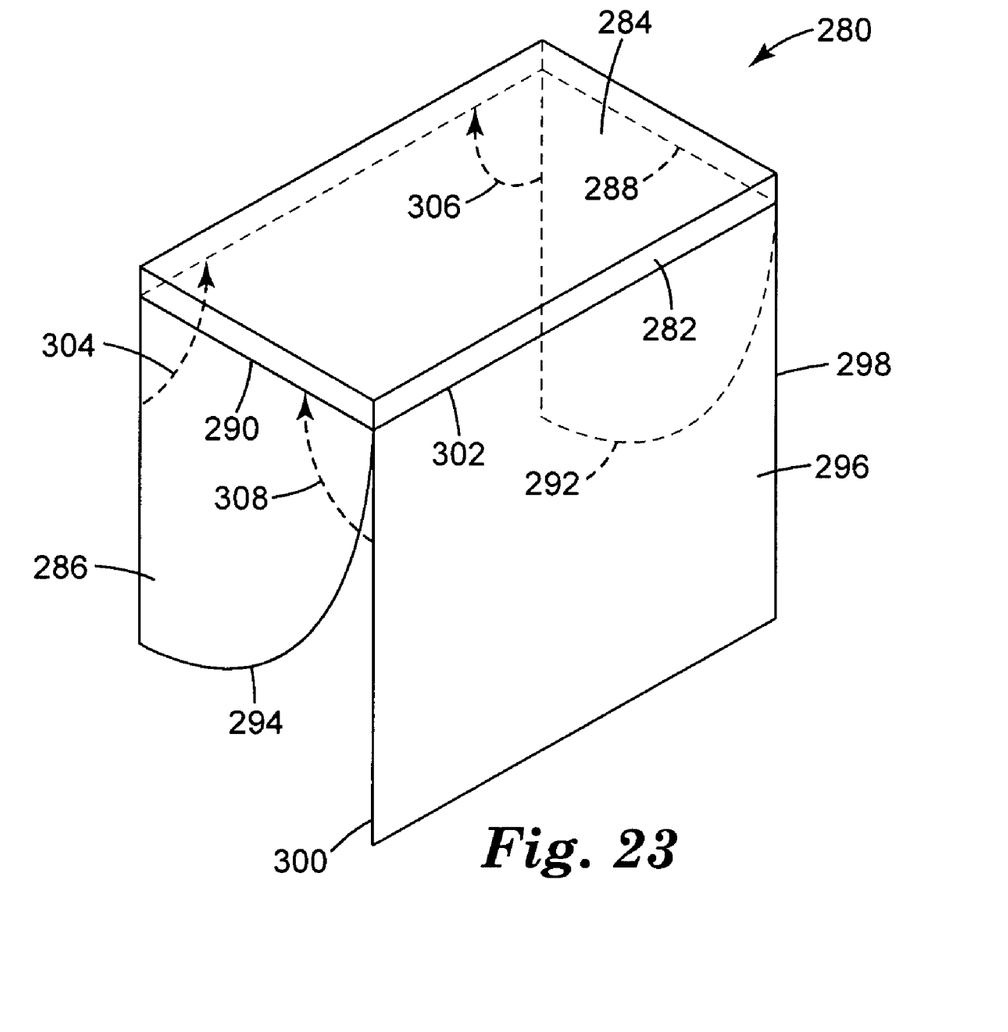
FIG. 23 is a perspective view of a collapsible passive backlight for a daylight-coupled display.

FIG. 23 is a perspective view of a collapsible passive backlight 280 for a daylight-coupled display. Collapsible backlight 280 includes a diffuser 282, side panels 284 and 286, and a reflector 296. Side panel 284 has a flexible connection 288 with diffuser 282, and side panel 286 has a flexible connection 290 with diffuser 282. Reflector 296 also has a flexible connection 302 with diffuser 282. Diffuser 282, side panels 284 and 286, and reflector 296 can be implemented with, for example, those materials identified above. If they are implemented with a rigid material, the flexible connection can be implemented with a hinge or flexible material, for example. If they are implemented with a flexible material, such as a film, then the material itself can provide for the flexible connection.

When backlight 280 is not in use, flexible connection 288 allows side panel 284 to fold upward next to diffuser 282 as represented by arrow 306, flexible connection 290 allows side panel 286 to fold upward next to diffuser 282 as represented by arrow 304, and flexible connection 302 allows reflector 296 to fold upward next to diffuser 282 as represented by arrow 308. Folding the side panels and reflector in such a manner allows backlight 280 to be shipped in a flat container or stored in a flat manner. In order to install or use backlight 280, edges 298 and 300 of reflector 296 would be affixed or held adjacent to edges 292 and 294, respectively, of side panels 284 and 286 such as with adhesive, tape, or a frame. Edges 298 and 300 can be at least held at their corners to the side panels. The open portion of backlight 280 would then be affixed or held adjacent behind an LCD panel or static display panel such as with a frame. When in use, backlight 280 can operate in a manner similar to device 10 for backlighting of an LCD panel or static display panel.

The invention claimed is:

1. A passive daylight-coupled display, comprising:
   an LCD panel having a top side and a bottom side;
   a diffuser having a front edge adjacent the top side of the LCD panel and having a back edge; and
   a curved reflector having a top side adjacent the back edge of the diffuser and having a bottom side adjacent the bottom side of the LCD panel,
   wherein the diffuser transmits daylight to the reflector and wherein the reflector reflects the daylight to the LCD panel and provides for substantially uniform distribution of the daylight on the LCD panel,
   further comprising a turning film located behind the LCD panel.

2. A passive daylight-coupled display, comprising:
   an LCD panel having a top side and a bottom side;
   a diffuser having a front edge adjacent the top side of the LCD panel and having a back edge; and
   a curved reflector having a top side adjacent the back edge of the diffuser and having a bottom side adjacent the bottom side of the LCD panel,
   wherein the diffuser transmits daylight to the reflector and wherein the reflector reflects the daylight to the LCD panel and provides for substantially uniform distribution of the daylight on the LCD panel,
   wherein the reflector comprises a reflective polarizing film.

3. The display of claim 2, wherein the LCD panel is positioned at an angle of approximately 90° to the diffuser.

4. The display of claim 2, wherein the reflector has a circular shape.

5. The display of claim 2, wherein the reflector has a parabolic shape.

6. The display of claim 2, wherein a ratio of a height of the LCD panel to a depth of the diffuser is approximately 1 to 1.

7. The display of claim 2, wherein a ratio of a height of the LCD panel to a depth of the diffuser is approximately 1 to 0.5.

8. The display of claim 2, wherein the LCD panel is a transflective panel.

9. The display of claim 2, further comprising solar cells located behind the reflector.

10. The display of claim 2, further comprising a film located in front of the LCD panel, wherein the film comprises one or more of the following: a shatter protection film; an anti-glare film; an antireflective film; an IR film; or a single film with multiple functionalities.

11. The display of claim 2, further comprising one or more of the following films located in back of the LCD panel: a reflective polarizer film; a reflective polarizer film with diffuse adhesive; microreplicated films; or a single film with multiple functionalities.

12. The display of claim 2, wherein the diffuser comprises a faceted top surface.

13. The display of claim 2, wherein a light pipe, mirror, lens, ambient light concentrator, or shutter system transmits light to the diffuser.

14. A multi-unit passive daylight-coupled display, comprising:
   a first LCD panel having a top side and a bottom side;
   a second display panel having a top side and a bottom side, wherein the second display panel is located opposite the first LCD panel;
   a diffuser having a front edge adjacent the top side of the first LCD panel and having a back edge adjacent the top side of the second display panel; and
   a first reflector having a top side adjacent the front edge of the diffuser and having a bottom side adjacent the bottom side of the second display panel;
   a second reflector having a top side adjacent the back edge of the diffuser and having a bottom side adjacent the bottom side of the first LCD panel,
   wherein the diffuser transmits daylight to the first and second reflectors, wherein the first reflector reflects the daylight to the second display panel and provides for substantially uniform distribution of the daylight on the second display panel, and wherein the second reflector reflects the daylight to the first LCD panel and provides for substantially uniform distribution of the daylight on the first LCD panel.

15. The display of claim 14, wherein the second display panel comprises an LCD panel.

16. The display of claim 14, wherein the second display panel comprises a static display panel.

17. The display of claim 14, wherein the first and second reflectors each comprise a reflective polarizing film.

18. A multi-unit passive daylight-coupled display, comprising:
   an LCD panel having a top side and a bottom side;
   a diffuser having a front edge adjacent the top side of the first LCD panel and having a back edge;
   a first reflector having a top side adjacent the back edge of the diffuser and having a bottom side adjacent approximately a mid-point of the LCD panel;
   a second reflector having a top side adjacent the back edge of the diffuser and having a bottom side adjacent the bottom side of the LCD panel; and
   a polarization rotator located behind the LCD panel from either approximately the mid-point of the LCD panel to the bottom side of the LCD panel or approximately the mid-point of the LCD panel to the top side of the LCD panel,
   wherein the diffuser transmits daylight to the first and second reflectors, wherein the first reflector reflects the daylight to a top portion of the LCD panel and provides for substantially uniform distribution of the daylight on the top portion of the LCD panel, and wherein the second reflector reflects the daylight to a bottom portion of the LCD panel and provides for substantially uniform distribution of the daylight on the bottom portion of the LCD panel.

19. The display of claim 18, wherein the first reflector comprises a reflective polarizing film.

20. The display of claim 18, wherein a ratio of the height of the LCD panel to the depth of the diffuser is approximately 1 to 0.5.

21. The display of claim 18, wherein a ratio of the height of the LCD panel to the depth of the diffuser is approximately 1 to 0.375.

22. A multi-unit passive daylight-coupled display, comprising:
   a first LCD panel having a top side and a bottom side;
   a second LCD panel having a top side located adjacent the bottom side of the first LCD panel and having a bottom side;
   a diffuser having a front edge adjacent the top side of the first LCD panel and having a back edge;
   a first reflector having a top side adjacent the back edge of the diffuser and having a bottom side adjacent the bottom side of the first LCD panel; and
   a second reflector having a top side adjacent the back edge of the diffuser and having a bottom side adjacent the bottom side of the second LCD panel,
   wherein the diffuser transmits daylight to the first and second reflectors, wherein the first reflector reflects the daylight to the first LCD panel and provides for substantially uniform distribution of the daylight on the first LCD panel, and wherein the second reflector reflects the daylight to the second LCD panel and provides for substantially uniform distribution of the daylight on the second LCD panel.

23. The display of claim 22, wherein a ratio of the combined heights of the LCD panels to the depth of the diffuser is approximately 1 to 0.5.

24. The display of claim 22, wherein a ratio of the combined heights of the LCD panels to the depth of the diffuser is approximately 1 to 0.375.

25. The display of claim 22, wherein the first reflector comprises a reflective polarizing film.

26. A hybrid daylight-coupled display, comprising:
an LCD panel having a top side and a bottom side;
a diffuser having a front edge adjacent the top side of the LCD panel and having a back edge;
a curved reflector having a top side adjacent the back edge of the diffuser and having a bottom side adjacent the bottom side of the LCD panel, wherein the diffuser transmits daylight to the reflector and wherein the reflector reflects the daylight to the LCD panel and provides for substantially uniform distribution of the daylight on the LCD panel, wherein the reflector comprises a reflective polarizing film; and
an active backlight for providing, when activated, substantially uniform distribution of light on the LCD panel.

27. The display of claim 26, wherein the active backlight comprises an LED bar.

28. The display of claim 26, wherein the active backlight comprises an LED array.

29. The display of claim 26, wherein the active backlight comprises a CCFL source.

30. The display of claim 26, wherein the active backlight comprises a hollow back light.

31. The display of claim 26, wherein the active backlight comprises a film-based light injector.

32. The display of claim 26, wherein the active backlight comprises a transparent light guide with a light extractor plate with a light injector.

33. A hybrid daylight-coupled display, comprising:
an LCD panel having a top side and a bottom side;
a diffuser having a front edge adjacent the top side of the LCD panel and having a back edge;
a reflector having a top side adjacent the back edge of the diffuser and having a bottom side adjacent the bottom side of the LCD panel, wherein the diffuser transmits daylight to the reflector and wherein the reflector reflects the daylight to the LCD panel and provides for substantially uniform distribution of the daylight on the LCD panel; and
an active backlight for providing, when activated, substantially uniform distribution of light on the LCD panel,
further comprising a shutter located adjacent the diffuser for reducing or preventing light from exiting the diffuser when the active backlight is activated.

34. The display of claim 33, wherein a control system controls the shutter.

35. The display of claim 26, wherein a control system modulates the active light source.

36. The display of claim 35, wherein a control system adjusts the intensity or color of the active light source.

37. A multi-unit passive daylight-coupled display, comprising:
a first static display panel having a top side and a bottom side;
a second static display panel having a top side and a bottom side, wherein the second static display panel is located opposite the first static display panel;
a diffuser having a front edge adjacent the top side of the first static display panel and having a back edge adjacent the top side of the second static display panel;
a bottom panel having a front edge adjacent the bottom side of the first static display panel and having a back edge adjacent the bottom side of the second static display panel;
a first side panel located between a first side of the first static display panel and a first side of the second static display panel;
a second side panel located between a second side of the first static display panel and a second side of the second static display panel; and
a reflector located on the bottom panel on the inside of the display,
wherein the first and second side panels comprise reflectors, wherein the diffuser transmits daylight inside the display, and wherein the reflector and the first and second side panels provide for substantially uniform backlighting of the first and second static display panels.

38. A multi-unit passive daylight-coupled display, comprising:
a first static display panel having a top side and a bottom side;
a second panel having a top side and a bottom side, wherein the second panel is located opposite the first static display panel;
a diffuser having a front edge adjacent the top side of the first static display panel and having a back edge adjacent the top side of the second panel;
a bottom panel having a front edge adjacent the bottom side of the first static display panel and having a back edge adjacent the bottom side of the second panel;
a first side panel located between a first side of the first static display panel and a first side of the second panel;
a second side panel located between a second side of the first static display panel and a second side of the second panel; and
a reflector located on the bottom panel on the inside of the display and on the second panel on the inside of the display,
wherein the first and second side panels comprise reflectors, wherein the diffuser transmits daylight inside the display, and wherein the reflector and the first and second side panels provide for substantially uniform backlighting of the first static display panel.

39. A passive collapsible backlight for a daylight-coupled display, comprising:
a diffuser having a front edge, a back edge, a first side edge, and a second side edge; and
a reflector having a top side flexibly connected with the back edge of the diffuser and having a bottom side;
a first side panel having a top edge flexibly connected with the first side edge of the diffuser and having a front edge; and
a second side panel having a top edge flexibly connected with the second side edge of the diffuser and having a front edge,
wherein the reflector, the first side panel, and the second side panel are each capable of folding for placement next to the diffuser, and
wherein when the backlight is in use the front edge of the diffuser, the bottom side of the reflector, the front edge of the first side panel, and the front edge of the second side panel are each placed adjacent a display panel for backlighting the display panel and for providing substantially uniform distribution of daylight on the display panel.

* * * * *